(12) United States Patent
Pettay et al.

(10) Patent No.: US 10,574,827 B1
(45) Date of Patent: *Feb. 25, 2020

(54) METHOD AND APPARATUS OF PROCESSING USER DATA OF A MULTI-SPEAKER CONFERENCE CALL

(71) Applicant: West Corporation, Omaha, NE (US)

(72) Inventors: Mark J. Pettay, Omaha, NE (US); Hendryanto Rilantono, Omaha, NE (US); Myron P. Sojka, Logan, IA (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,686

(22) Filed: Apr. 9, 2019

Related U.S. Application Data

(63) Continuation of application No. 16/018,330, filed on Jun. 26, 2018, now Pat. No. 10,257,361, which is a continuation of application No. 15/464,604, filed on Mar. 21, 2017, now Pat. No. 10,009,474, which is a continuation of application No. 13/307,193, filed on Nov. 30, 2011, now Pat. No. 9,601,117.

(51) Int. Cl.
| | |
|---|---|
| *H04M 3/42* | (2006.01) |
| *H04M 3/56* | (2006.01) |
| *H04L 29/06* | (2006.01) |
| *G10L 21/0272* | (2013.01) |
| *G10L 15/26* | (2006.01) |
| *H04M 7/00* | (2006.01) |
| *G06F 17/24* | (2006.01) |
| *G06F 3/0481* | (2013.01) |

(52) U.S. Cl.
CPC ............ *H04M 3/567* (2013.01); *G06F 17/24* (2013.01); *G10L 15/26* (2013.01); *G10L 15/265* (2013.01); *G10L 21/0272* (2013.01); *H04L 65/4007* (2013.01); *H04M 3/42221* (2013.01); *H04M 7/0027* (2013.01); *G06F 3/0481* (2013.01); *H04M 2201/22* (2013.01); *H04M 2201/41* (2013.01); *H04M 2203/301* (2013.01); *H04M 2203/303* (2013.01)

(58) Field of Classification Search
CPC ....... G10L 15/32; G10L 17/00; G06Q 10/103; G06Q 10/1095; H04L 12/1818; H04L 12/581; H04L 51/04; H04L 47/70; H04M 2203/5063; H04M 2203/5054; H04M 3/567
USPC .... 704/200, 235, 9, 255, 243; 715/744, 202; 709/204, 203; 707/769, 636; 379/204.01, 202.01; 370/352, 260
See application file for complete search history.

(56) References Cited

U.S. PATENT DOCUMENTS

| | | | | |
|---|---|---|---|---|
| 5,333,275 | A | * | 7/1994 | Wheatley ................ G10L 15/18 704/231 |
| 5,382,972 | A | * | 1/1995 | Kannes ................... H04N 5/445 348/14.01 |

(Continued)

Primary Examiner — Michael C Colucci

(57) ABSTRACT

A method and apparatus of sharing documents during a conference call data is disclosed. One example method may include initiating a document sharing operation during a conference call conducted between at least two participants communicating during the conference call. The method may also include transferring the document from one of the two participants to another of the two participants, and recording at least one action performed to the document by the participants during the conference call.

20 Claims, 7 Drawing Sheets

(56) References Cited

U.S. PATENT DOCUMENTS

| | | | | |
|---|---|---|---|---|
| 6,014,135 A * | 1/2000 | Fernandes | | G06F 3/0481 |
| | | | | 709/203 |
| 6,260,011 B1 * | 7/2001 | Heckerman | | G06F 17/30017 |
| | | | | 704/231 |
| 6,477,491 B1 * | 11/2002 | Chandler | | G10L 15/26 |
| | | | | 704/235 |
| 6,535,848 B1 * | 3/2003 | Ortega | | G06F 17/30746 |
| | | | | 704/235 |
| 7,219,123 B1 * | 5/2007 | Fiechter | | H04M 1/72561 |
| | | | | 704/E15.045 |
| 7,243,060 B2 * | 7/2007 | Atlas | | G10L 21/028 |
| | | | | 704/200 |
| 7,287,221 B2 * | 10/2007 | Bodin | | G06F 17/211 |
| | | | | 704/200 |
| 8,346,231 B1 * | 1/2013 | Smith | | H04L 12/1818 |
| | | | | 379/202.01 |
| 8,447,731 B1 * | 5/2013 | Madhava | | G06Q 10/10 |
| | | | | 707/636 |
| 8,571,194 B2 * | 10/2013 | Turner | | H04L 12/1818 |
| | | | | 370/261 |
| 2003/0050777 A1 * | 3/2003 | Walker, Jr. | | G10L 15/30 |
| | | | | 704/235 |
| 2004/0076435 A1 * | 4/2004 | Stolyarov | | B60R 16/0315 |
| | | | | 398/75 |
| 2004/0107253 A1 * | 6/2004 | Ludwig | | G06Q 10/10 |
| | | | | 709/204 |
| 2004/0117186 A1 * | 6/2004 | Ramakrishnan | | G10L 21/028 |
| | | | | 704/255 |
| 2004/0153504 A1 * | 8/2004 | Hutchinson | | G06F 17/30017 |
| | | | | 709/204 |
| 2004/0186712 A1 * | 9/2004 | Coles | | G10L 15/26 |
| | | | | 704/235 |
| 2006/0253418 A1 * | 11/2006 | Charnock | | G06F 17/30716 |
| 2007/0050451 A1 * | 3/2007 | Caspi | | H04M 3/56 |
| | | | | 709/204 |
| 2007/0115919 A1 * | 5/2007 | Chahal | | H04L 29/06027 |
| | | | | 370/352 |
| 2008/0319744 A1 * | 12/2008 | Goldberg | | G06Q 10/10 |
| | | | | 704/235 |
| 2009/0135741 A1 * | 5/2009 | Mykhalchuk | | H04L 12/1827 |
| | | | | 370/260 |
| 2010/0063815 A1 * | 3/2010 | Cloran | | G06Q 10/10 |
| | | | | 704/235 |
| 2010/0125450 A1 * | 5/2010 | Michaelangelo | | G06F 17/2725 |
| | | | | 704/9 |
| 2011/0090231 A1 * | 4/2011 | Heilakka | | G06T 13/00 |
| | | | | 345/473 |
| 2011/0228922 A1 * | 9/2011 | Dhara | | H04L 12/1818 |
| | | | | 379/202.01 |
| 2013/0054636 A1 * | 2/2013 | Tang | | G06F 17/241 |
| | | | | 707/769 |

* cited by examiner

METHOD AND APPARATUS OF PROCESSING USER DATA OF A MULTI-SPEAKER CONFERENCE CALL

CROSS-REFERENCE TO RELATED APPLICATIONS

The present patent application is a continuation of and claims priority from patent application Ser. No. 16/018,330, titled METHOD AND APPARATUS OF PROCESSING USER DATA OF A MULTI-SPEAKER CONFERENCE CALL, filed Jun. 26, 2018, which is a continuation of and claims priority from patent application Ser. No. 15/464,604, titled METHOD AND APPARATUS OF PROCESSING USER DATA OF A MULTI-SPEAKER CONFERENCE CALL, filed Mar. 21, 2017, now issued U.S. Pat. No. 10,009,474, which is a continuation of and claims priority from patent application Ser. No. 13/307,193, titled METHOD AND APPARATUS OF PROCESSING USER DATA OF A MULTI-SPEAKER CONFERENCE CALL, filed Nov. 30, 2011, now issued U.S. Pat. No. 9,601,117, the entire contents of each of which are enclosed by reference herein.

TECHNICAL FIELD OF THE INVENTION

This invention relates to a method and apparatus of processing user input speech from multiple conference call participants, and in particular, to distinguishing between the various conference call participants and processing the call participants' speech into text.

BACKGROUND OF THE INVENTION

Conference calls are commonly used to connect a group of participants together through voice and/or video data in real time. The quality of the conference call data is important for capturing accurate data to reflect the discussions performed during the conference call. For example, a conference call may be recorded and the voice recording may be used to generate a textual transcription of the words spoken by the participants during the conference call.

Conventionally, a transcriptionist may be present during the call to hear and type the words spoken by the participants. Other ways to capture the content of the conference call may be to record the voice and use a digital software program application to convert the voice or speech into text. Voice recognition software programs may be used to convert human speech into text so that the words spoken by the conference call participants may be later referenced by others to review the content of the conference call.

Currently, a conference call is recorded by a single recording effort, which is stored in a single recorded file. A transcription of the recording may then be enacted via a speech-to-text software application that identifies the words spoken by the conference call participants and converts the words into text. Another option may be to use a human transcriptionist, or a combination of both a human transcriptionist and a software application to convert the speech into text.

Current software applications are limited to a single recording of a conference call with limited ability to distinguish between different speakers. Such applications have a low percentage of accuracy due to the limited capabilities of the software application. For example, the software application may not be capable of distinguishing the different voices from one another. Also, the different recorded voices may be overlapping, and some voices may be louder than other recorded voices. These various shortcomings of a single data recording may cause interference when attempting to transcribe the audio content of the voices of the conference call participants.

SUMMARY OF THE INVENTION

One embodiment of the present invention may include a method of sharing a document during a conference call. The method may include initiating a document sharing operation during a conference call conducted between at least two participants communicating during the conference call and transferring the document from one of the at least two participants to at least one other of the at least two participants. The method may also provide recording at least one action performed to the document by at least one of the at least two participants during the conference call.

Another example embodiment of the present invention may include an apparatus configured to share data during a conference call. The apparatus may include a memory and a processor configured to perform certain operations. The processor may be configured to initiate a document sharing operation during the conference call conducted between at least two participants communicating during the conference call and transfer the document from one of the at least two participants to at least one other of the at least two participants. The apparatus may also include a recording device configured to record at least one action performed to the document by at least one of the at least two participants during the conference call and store the recorded at least one action in the memory.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1A:
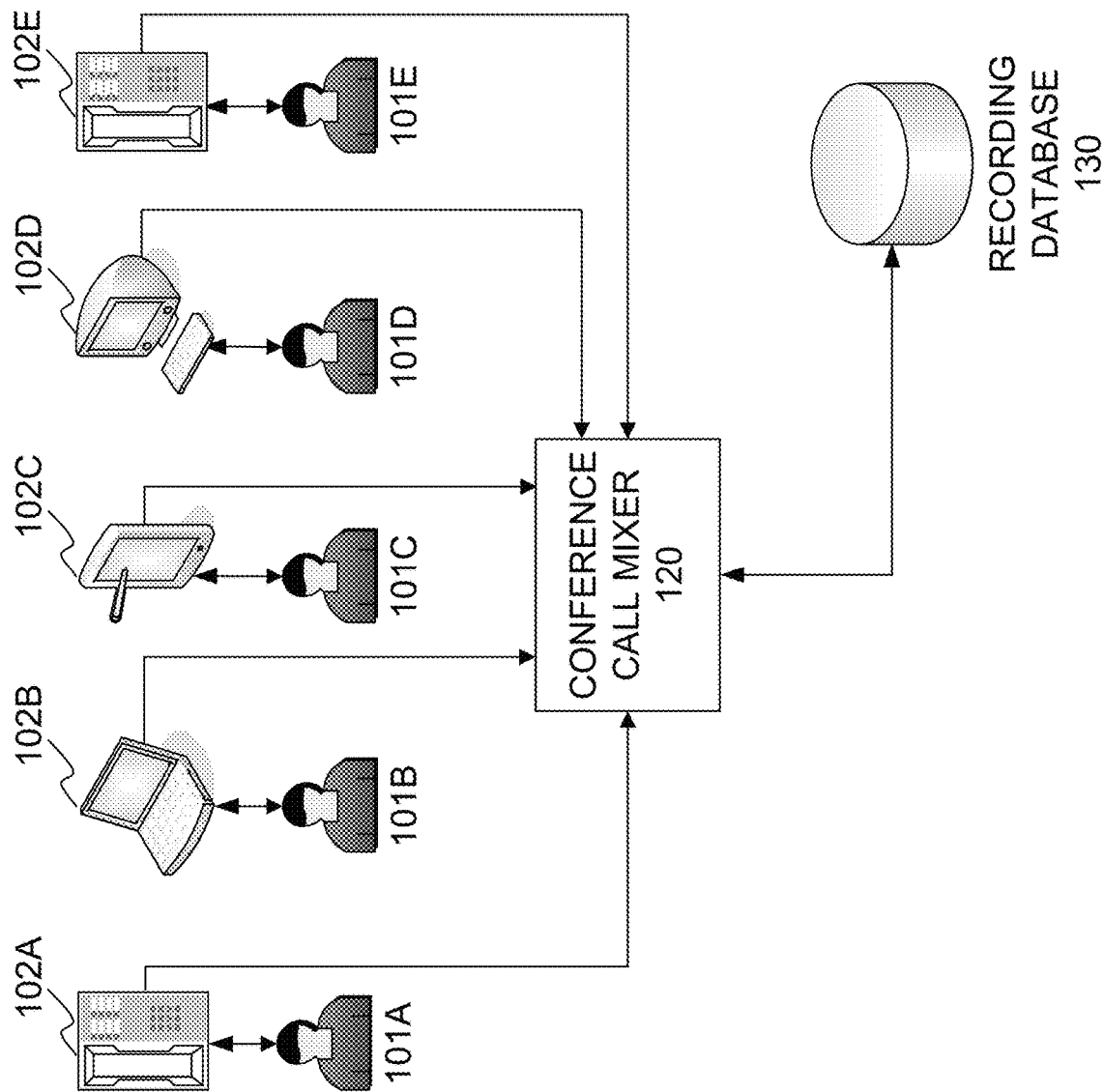
FIG. 1A illustrates an example conference call system according to example embodiments of the present invention.

According to example embodiments of the present invention, separate recordings may be performed for different conference call participants. FIG. 1A illustrates an example conference call configuration with various different conference call participants 101A, 101B, 101C, 101D and 101E. In general, there is no limit to the number of conference call participants that may simultaneously participate in an open discussion conference call. Such a conference call configuration may provide the capability for any of the conference call participants 101A through 101E to actively participate by speaking at any time, or only speaking in an order determined by the conference call bridge application.

Each of the participants 101A through 101E may participate in the conference call via a corresponding telephony device 102A and 102E and/or a digital communications device, such as a laptop 102B, a tablet computing device 102C (e.g., IPAD®), and a desktop computer 102D. The conference call may be a telephony based call (PSTN) or a digital communications call, such as VoIP routed over the Internet. The conference call may be established through a telephony-based communication system or through a third party web service or other data service provider.

Once a participant has entered an active conference call, each of the call participants 101A through 101E will be assigned a particular voice channel number. Such a voice channel number may be associated with any of a plurality of different identifiers, such as user name, password, alias, port number used to identify the port on the conference call bridge switch, a local IP address of a computing device used to access the conference call, etc. Each participant may have their own unique voice channel. The activity associated with each voice channel may be recorded separately.

In operation, a user would access a conference call and be assigned a voice channel that is identified each time the user speaks. The voice channel may be associated with a timestamp of the master recording, which enables the user to be identified easier when attempting to distinguish the different voices of the different participants. The timestamps may reference a master time log of the entire call. The timestamps may be assigned to the user that is currently speaking at the present time. It is possible to record the different users separately during the course of the entire conference call and then later reconstruct the call based on the separate recordings of the separate participants.

There are multiple options available to associate a conference call participant 102(A-E) with a particular channel on a conference call. For example, a user assigned automatic number identification (ANI) procedure may be used to identify subscriber information. Caller registration data may be identified at the beginning of the call. For example, if a call participant registers to have an outdial bridge a call, the information provided for the outdial could be associated with a channel number assigned to the outdial. Timeslot information may be used to indicate that a channel was "active." Such timeslot information would be logged so that a portion of the call recording could be "assigned" to variables associated with the channel used to identify the owner of the channel.

The conference call mixer 120 provides an integrated conference call switch and recording device. In operation, the conference call may be setup and handed-over to the conference call mixer 120, which performs recording of the participants' speech as they speak during the course of the conference call. As the individual speech tracks or participant recordings are produced during the conference call, corresponding voice files may be created and stored in a recording database 130.

Figure 1B:
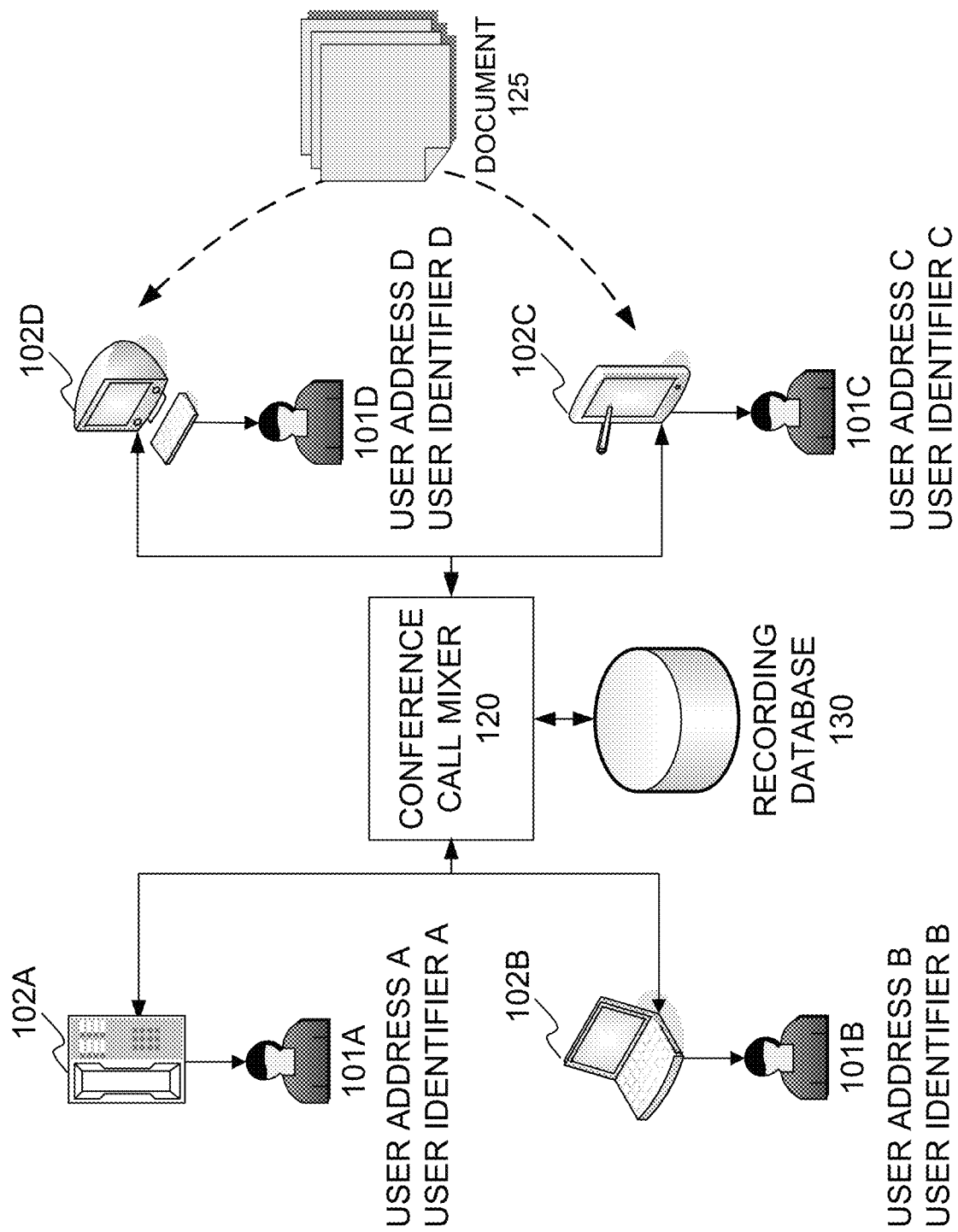
FIG. 1B illustrates an example conference call document exchange configuration according to example embodiments of the present invention.

FIG. 1B illustrates an example conference call session and corresponding document exchange platform according to example embodiments of the present invention. Referring to FIG. 1B, user workstations, mobile stations and/or other network capable devices may connect to a conference call bridge to communicate voice and video data during a live conference call session. During the conference call session, the users 101A, 101B, 101C and 101D may also exchange documents and other data elements by incorporation one or more known conference call and advanced document exchange applications (i.e., Skype, Google+, etc.).

In order to maintain records of the user interactions, (e.g., voice, video, document exchanges, document modifications, etc.) the call processing system may be capable of determining which end station or user station 101 actually sent, modified, created, accepted, etc., the document during the call session. The identification procedure may be based on a user address (A-E) and identifier (A-E). The user address may be a dynamically assigned network address (IP address) or a static hardware address (MAC address) or a combination of both address types.

The user address information may also be a temporary user session address assigned at the beginning of the conference call session. The address may be a wireless identifier such as a mobile identification number. The user may desire to share a document during the conference call with another user. For this example, user 101C may reference a document and notify user 101D that the document is going to be shared momentarily. The document may then be selected and shared via a simple browsing operation and share button link. The option to share may invoke various features to ensure a safe, quick and reliable sharing experience with other conference call users.

Once the user 101C decides to share a document and the document is located via a browsing operation, the application may then prompt the user to select the name of the user to share with as illustrated on a conference call interface. Each user may have their name or alias presented during the call session for convenience. Once user 101C selects the name of user 101D (i.e., user 101D "Mike"), the name or alias "Mike" is then used as a reference by retrieving a record of the user's hardware profile and network information. For example, the hardware profile may include a MAC address, MIN, current IP address, port address, user call session assignment number (user 2 of 4), etc. The users' records are stored in the recording database 130.

The user 101C may then finish the document sharing operation with user 101D by selecting the user with whom to share and electing to share a particular document(s). The user 101D may then open, review, comment, electronically highlight, add content, remove content, etc., with respect to the shared document. The shared document 125 may then be updated for all users to observe and access. The corresponding transcription may also be referenced to indicate the users' interactions with the shared document. For instance, the transcription may indicate which user initiated access to the document, the user who the document was shared with, and the users who modified, viewed or did not perform such actions with respect to the document 125. The transcription final document crated after the conference call session may identify the document by a local memory link, web address, or remote link. Such information may be obtained from the document access operation, stored in memory and added to the transcription final document simply by having a user elect to share a document. Changes made to the document may also be identified and imported into the final transcription to reflect what was said by the user(s) and the action performed by the user(s), such as adding/removing a paragraph to the document) and voice comments referencing the document during a document review and editing session (i.e., actions). Such actions may be performed and placed in the master or final document in chronological order based on timestamps created while that action(s) are performed to the document.

Figure 2:
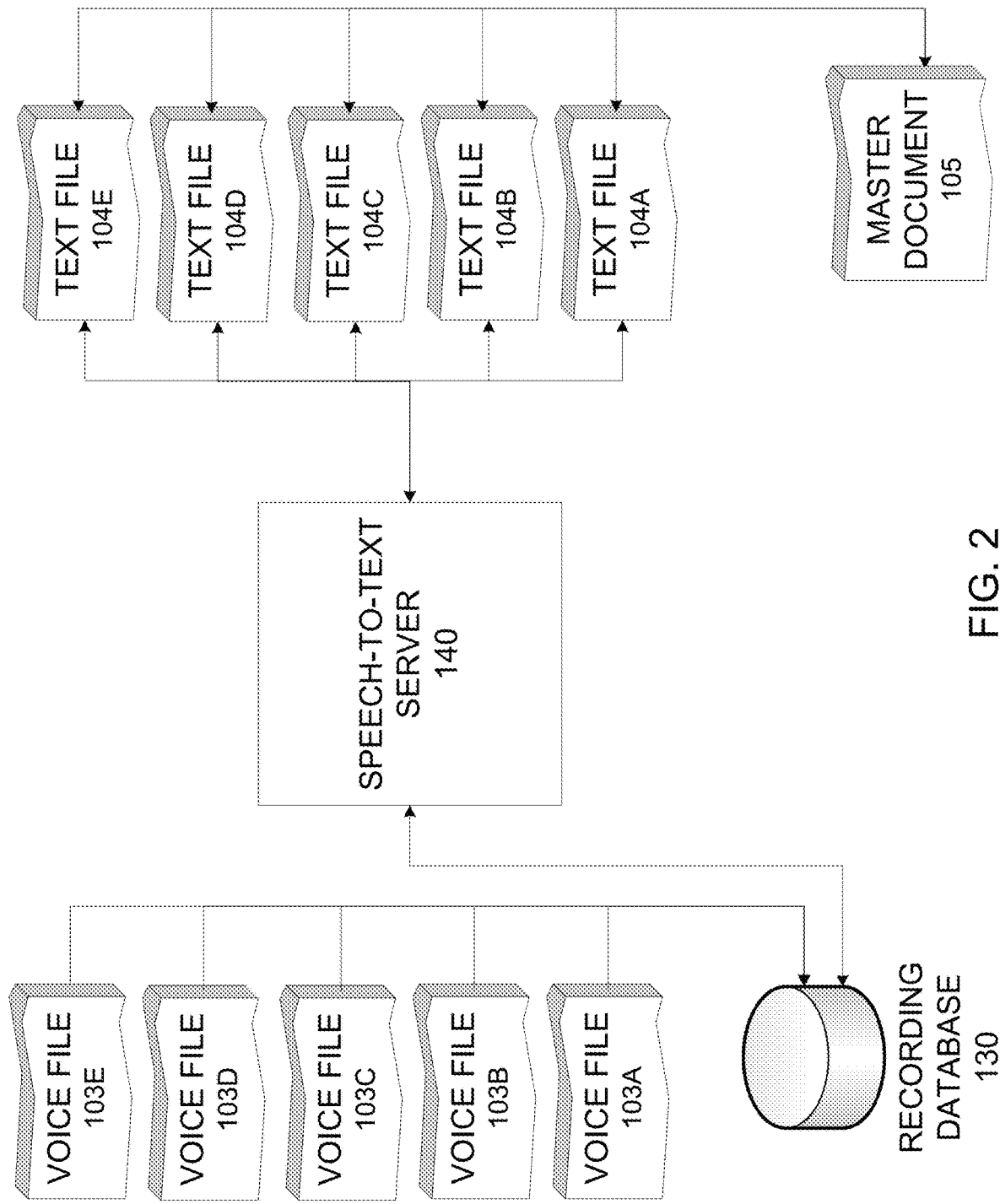
FIG. 2 illustrates an example conference call data processing logic diagram according to example embodiments of the present invention.

FIG. 2 illustrates a logic diagram of the conference call data processing, according to example embodiments of the present invention. Referring to FIG. 2, each of the participants 101A through 101E may have their speech recorded throughout the duration of the conference call and stored in individual data files corresponding to each of the participants. For example, voice files 103A, 103B, 103C, 103D and 103E may be individual voice files that correspond to the words spoken by each of the respective participants over the course of the conference call. The files 103A through 103E may be created and stored in a database 130. The files 103A through 103E are accessed by a speech-to-text server 140 in order to perform a voice-to-text conversion. The conversion procedure may select one file at a time to convert. The speech-to-text server 140 may select the files individually and convert them into a corresponding text file. Each of the voice files 103A through 103E may be converted to corresponding text files 104A through 104E and stored in memory.

The final (master) document 105 may be a completed transcript that includes all the words spoken by all of the participants of the conference call in one text document. The final document 105 may be created by converting each of the voice files 103A through 103E to text and interleaving the text of each of the text files 104A through 104E by timestamps associated with each of the spoken segments. The interleaving may include chronologically organizing timestamps associated with each of a number of spoken segments of the corresponding audio files. The text files 104A through 104E may have a list of spoken segments that identify the speaker and the timestamp associated with the spoken words of the speaker.

According to another example embodiment of the present invention, the conference call mixer 120 may create a timeline based on the timestamps. The timeline may associate the port used by the participant that has produced voice activity at a given point in time during the course of the conference call. After the conference call is completed, the recording of the entire conference call may be broken into components based on the timestamps, which identify the timeframe and information available to reflect the speaker. The individual voice instances or speech (i.e., snippets) may be processed by a speech-to-text engine for transcription. The results of the speech-to-text processing could then be re-compiled along with indicators of the speakers' identities.

Figure 3A:
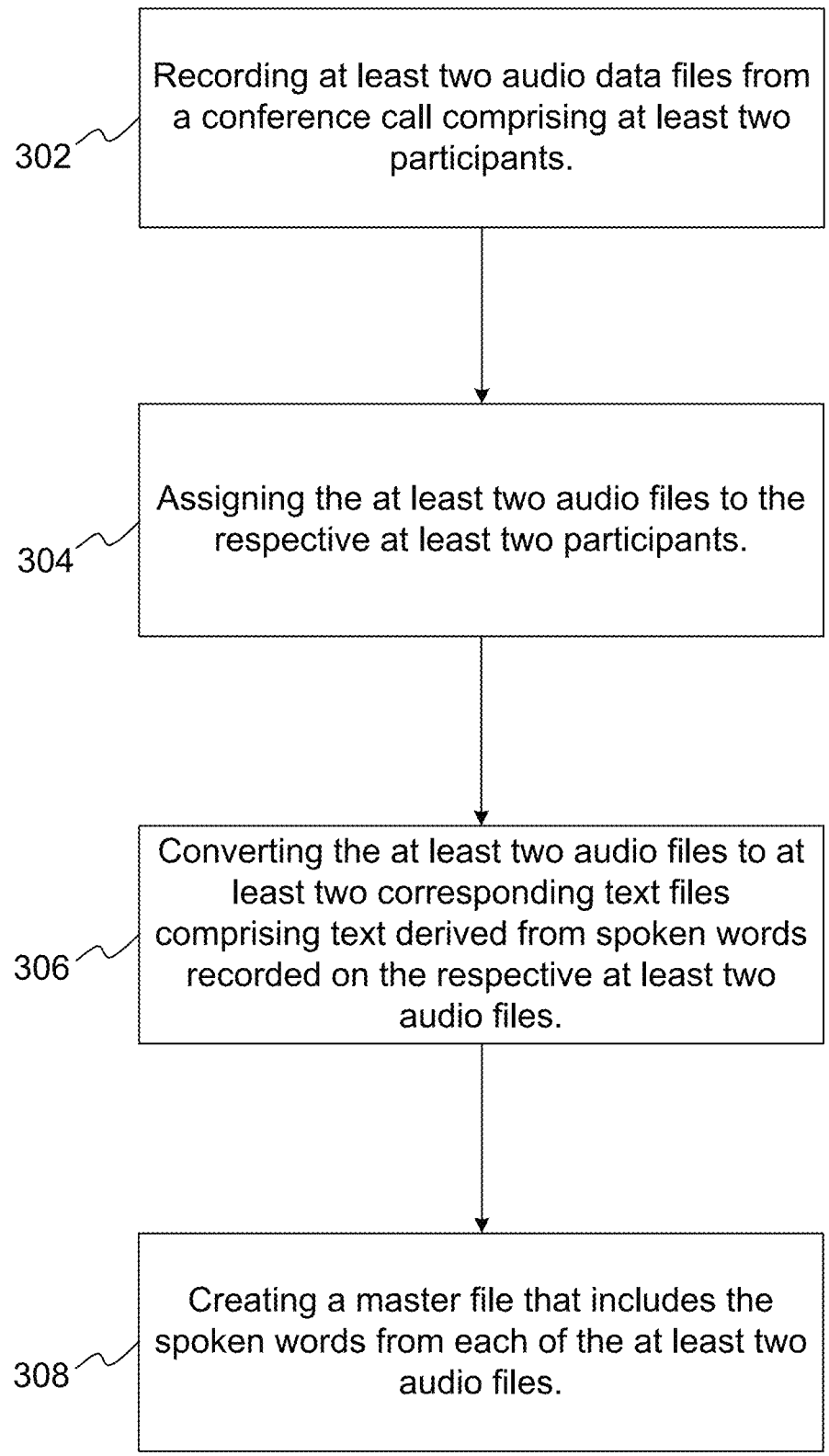
FIG. 3A illustrates an example flow diagram of an example method of operation according to example embodiments of the present invention.

FIG. 3A illustrates one example method of processing conference call data. The method may include recording at least two audio data files from a conference call including at least two participants, at operation 302. The method may also include assigning the at least two audio files to the respective at least two participants, at operation 304. The method further provides converting the at least two audio files to at least two corresponding text files comprising text derived from spoken words recorded on the respective at least two audio files, at operation 306. The method also includes creating a master file that includes the spoken words from each of the at least two audio files, at operation 308.

Figure 3B:
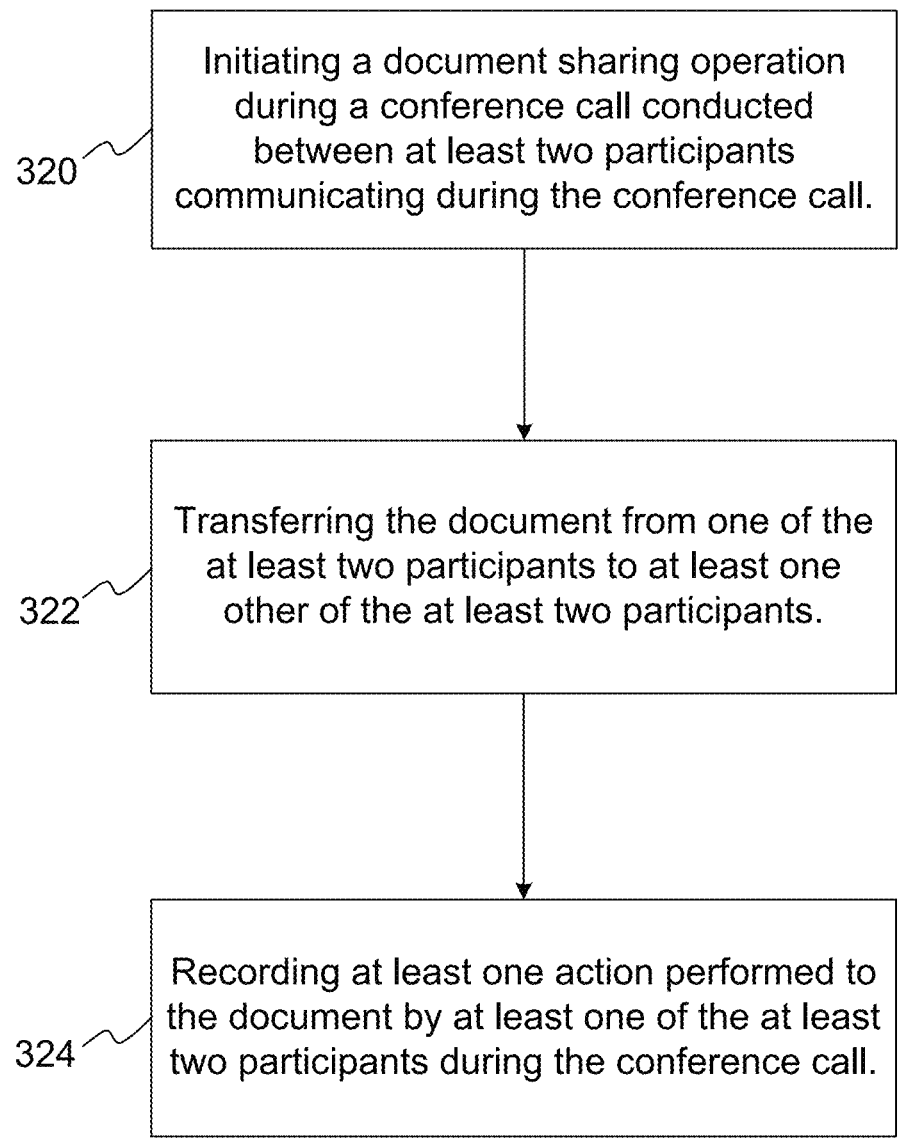
FIG. 3B illustrates another example flow diagram of an example method of operation according to example embodiments of the present invention.

FIG. 3B illustrates another example method of sharing a document during a conference. The method may include initiating a document sharing operation during a conference call conducted between at least two participants communicating during the conference call, at operation 320. The method may also include transferring the document from one of the at least two participants to at least one other of the at least two participants, at operation 322 and recording at least one action performed to the document by at least one of the at least two participants during the conference call at operation 324.

According to one example of a multiple-participant conference call, there may be a number of active or intended participants for a particular call session (e.g., 3 participants). As the participants speak and participated in the conference call their voices are received, stored and provided to a voice processing mixer followed by a voice-to-text translator for converting the audio into words.

The call processing system (e.g., items 120, 130 and 140 or any combination) keeps track of which call participants' line is busy or active. In other words, the call processing system is aware of which participants' line is active based on the user's ANI or other user specific attributes (e.g., port number, location specific information, etc.). When a first line becomes active (i.e., a person is talking), a start time may be set to indicate the time the user began speaking or at least initiated a spoken discussion. Next, when a second line becomes active, a stop time may be set to identify the time that the first line stopped participating, and a new start time may be set for the second line. Also, a name or identifier associated with each person may be associated with each of the user lines so the call processing system can identify exactly who is talking. As a result, when transcription occurs, the text will be matched with a name or parameter that may be mapped to a user's name providing an identification of a single participant at a time and including a name or address that identifies which user actually spoke which words.

Continuing with the same conference call example, the transcription can also be sent to another system or processing unit and/or to a human transcriptionist by separating the transcription into 3 separate parts (based on the 3 callers) and sending the 3 transcriptions to one or more different call processing sub-systems/processes or human transcriptionists who have the greatest capabilities to translate the user data. For example, if one of the callers has a French accent, that transcription may be sent to a French translator (=translator focus). In another example, if one of the callers is a doctor and there are many medical terms spoken, the transcription may be sent to a person who is familiar with these specific types of terms (=subject matter focus). However, the transcriptions may be sent to separate sub-processing units that are also setup to provide automated transcribing to circumvent the human interaction.

Next, the processed transcription(s) may be received back from the one or more different call processing sub-systems/processes and combined into a set of "clean" results as a final translated document. The user identifiers may be stored in a separate document (.CSV file, spreadsheet, etc.) and may be imported back into the final document via user identifier indicators to identify the names and locations of the users and related time stamps user to identify the location within the document. This final document provides a properly ordered set of user transcribed words based on the actual conversation of multiple participants. The final document may utilize a date and time associated with the users' transcribed words to chronologically order the layout of the final document transcription.

Figure 4:
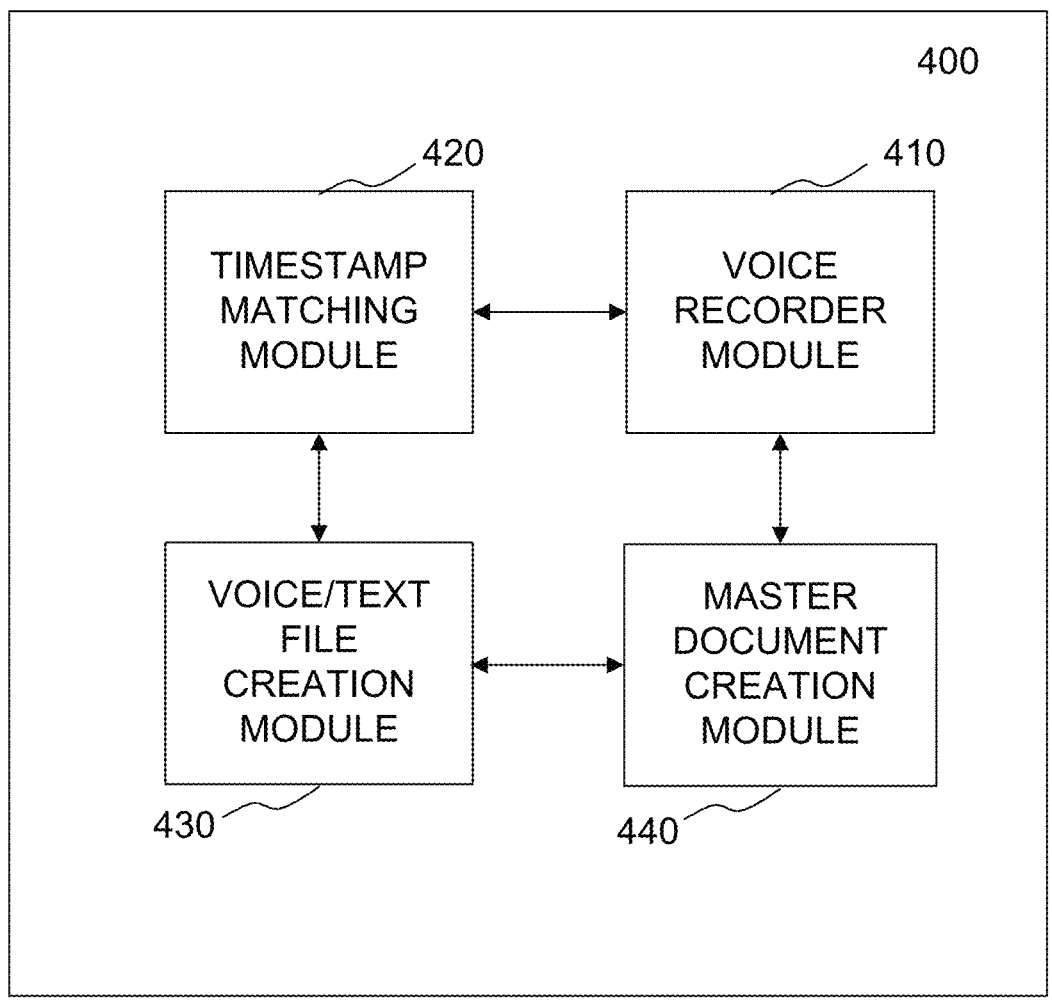
FIG. 4 illustrates an example system diagram of the speech-to-text server according to example embodiments of the present invention.

FIG. 4 illustrates a system diagram of a conference call processing entity 400, according to example embodiments of the present invention. Referring to FIG. 4, the conference call processing entity may be a separate server or internal processing device of one or more the network devices illustrated in FIGS. 1 and 2 of the present application. The processing entity 400 may be configured to record the voice files via a voice recorder module 410. The voice data may be paired with corresponding timestamps associated with the time the voice was recorded. The pairing operation may be performed via a timestamp matching module 420. The recorded voice may be recorded into individual voice files and formatted according to a specified file format required by the voice-to-text algorithm used to convert the voice files into text files. Such voice and text file processing may be performed by a voice/text file creation module 430. Lastly, the final transcription document may be produced by the final document creation module 440. The final document may be created from the plurality of voice/text files to include all of the speech from the entire conference call in chronological order based on the timestamps included in the voice/text files.

According to another example, the voice call data may be recorded as one master file or a plurality of individual files which together constitute the entire recorded call session. Flags may be used to identify the timestamps between the various audio files or the places in time where the different users begin and stop talking during the call. The flags and timestamps may also be used to subdivide a master audio file prior to transcribing the audio file. This allows the timestamps to be identified and the transcription itself may recognize the timestamps as transitions to other individuals and provide corresponding information in the transcription text as a result of the timestamp and/or flag data.

The operations of a method or algorithm described in connection with the embodiments disclosed herein may be embodied directly in hardware, in a computer program executed by a processor, or in a combination of the two. A computer program may be embodied on a computer readable medium, such as a non-transitory storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 5 illustrates an example network element 500, which may represent any of the above-described network components of FIGS. 1 and 2.

Figure 5:
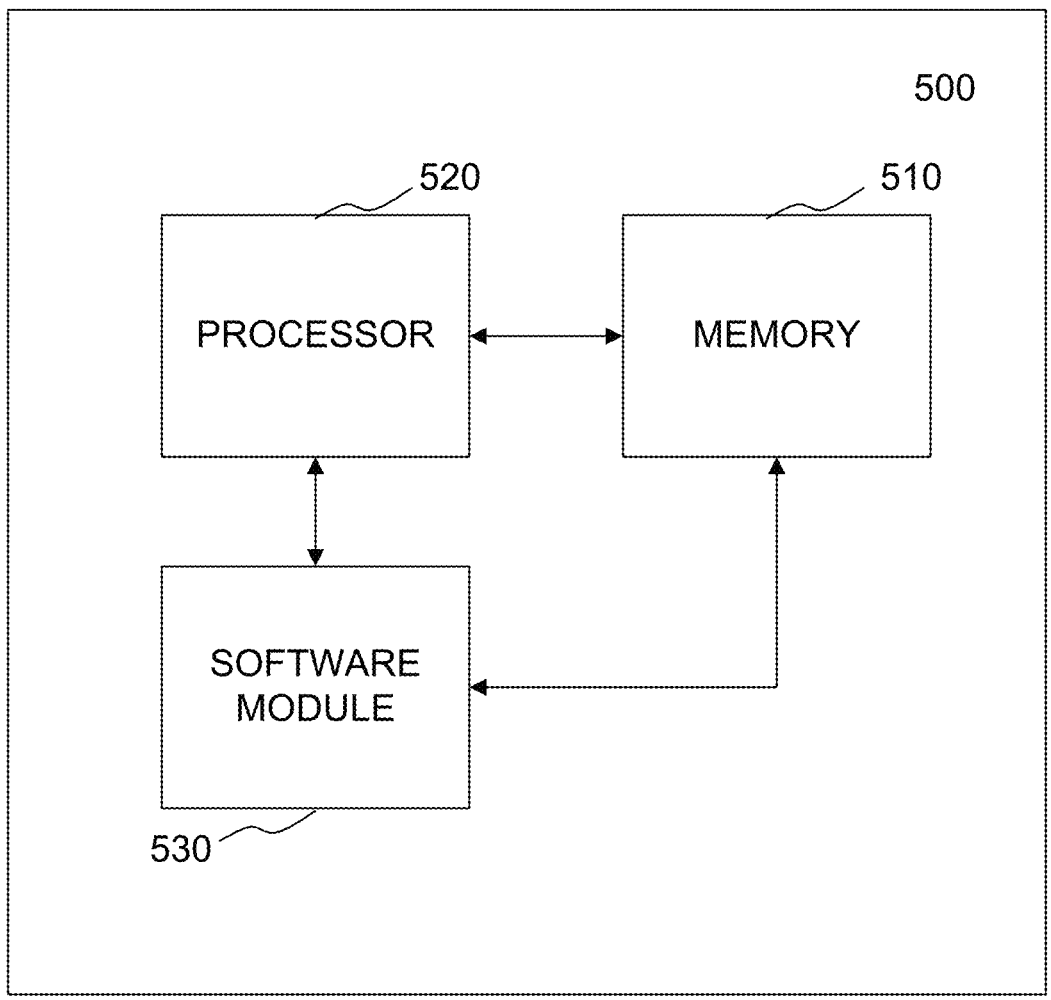
FIG. 5 illustrates a network entity that may include memory, software code and other computer processing hardware used to execute applications according to example embodiments of the present invention.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    transferring a document via a conference call application from one of at least two participants to at least one other of the at least two participants;
    placing at least one action performed to the document in a master file created during recording of speech occurring during the conference call;
    converting at least two audio files, each assigned to the respective at least two participants, to at least two corresponding text files comprising text derived from spoken words recorded on the respective at least two audio files; and
    placing the spoken words in the master file in chronological order based on timestamps included in the at least two audio data files.

2. The method of claim 1, wherein the at least one action performed to the document comprises at least one of adding, removing, and modifying content of the document.

3. The method of claim 1, comprising at least one of:
    initiating the document sharing operation via the conference call application during the conference call conducted between the at least two participants communicating during the conference call;
    prompting one of the at least two participants to select a user name illustrated on a conference call interface of a conference call application as an intended recipient of a shared document; and receiving the user name selection via the conference call interface.

4. The method of claim 1, comprising recording the at least one action performed to the document by at least one of the at least two participants during the conference call via the conference call application.

5. The method of claim 1, wherein the master file comprises a completed transcript of all speech recorded during the conference call and the at least one action performed to the document during the conference call.

6. The method of claim 1, wherein the at least two corresponding text files comprise a list of the plurality of spoken segments identifying a speaker and a timestamp identifying a time that spoken words of the speaker were recorded.

7. The method of claim 1, comprising retrieving a record of at least one of the at least two users' hardware profile and network address information responsive to initiating the sharing operation.

8. An apparatus, comprising:
a memory;
a processor configured to:
transfer a document via a conference call application from one of at least two participants to at least one other of the at least two participants;
place at least one action performed to the document in a master file created during speech that is recorded during the conference call;
convert at least two audio files, each assigned to the respective at least two participants, to at least two corresponding text files comprising text derived from spoken words recorded on the respective at least two audio files; and
place the spoken words in the master file in chronological order based on timestamps included in the at least two audio data files.

9. The apparatus of claim 8, wherein the at least one action performed to the document comprises at least one of addition, removal, and modification of content of the document.

10. The apparatus of claim 8, wherein the processor is configured to:
initiate the document share operation via the conference call application during the conference call conducted between the at least two communicative participants during the conference call;
prompt one of at least two participants to select a user name illustrated on a conference call interface of the conference call application as an intended recipient of a shared document; and
receive the user name selection via the conference call application.

11. The apparatus of claim 8, comprising a device configured to record the at least one action performed to the document by at least one of the at least two participants during the conference call via the conference call application and store the recorded at least one action in the memory.

12. The apparatus of claim 8, wherein the master file comprises a completed transcript of the speech recorded during the conference call.

13. The apparatus of claim 8, wherein the at least two corresponding text files comprise a list of the plurality of spoken segments that identify a speaker and a timestamp that identifies a time that spoken words of the speaker were recorded.

14. The apparatus of claim 8, wherein the processor is further configured to retrieve a record of at least one of the at least two users' hardware profile and network address information responsive to the share operation being initiated.

15. A non-transitory computer readable storage medium configured to stored instructions that when executed cause a processor to perform:
transferring a document via a conference call application from one of at least two participants to at least one other of the at least two participants;
placing at least one action performed to the document in a master file created during recording of speech occurring during the conference call;
converting at least two audio files, each assigned to the respective at least two participants, to at least two corresponding text files comprising text derived from spoken words recorded on the respective at least two audio files; and
placing the spoken words in the master file in chronological order based on timestamps included in the at least two audio data files.

16. The non-transitory computer readable storage medium of claim 15, wherein the at least one action performed to the document comprises at least one of adding, removing, and modifying content of the document.

17. The non-transitory computer readable storage medium of claim 15, wherein the processor performs:
initiating the document sharing operation via the conference call application during the conference call conducted between the at least two participants communicating during the conference call;
prompting one of at least two participants to select a user name illustrated on the conference call interface of the conference call application as an intended recipient of a shared document; and
receiving a user name selection via the conference call interface.

18. The non-transitory computer readable storage medium of claim 15, wherein the processor performs recording the at least one action performed to the document by at least one of the at least two participants during the conference call via the conference call application.

19. The non-transitory computer readable storage medium of claim 15, wherein the master file comprises a completed transcript of the speech recorded during the conference call.

20. The non-transitory computer readable storage medium of claim 15, wherein the at least two corresponding text files comprise a list of the plurality of spoken segments identifying a speaker and a timestamp identifying a time that spoken words of the speaker were recorded.

* * * * *